United States Patent [19]
Carlsson

[11] Patent Number: 4,558,724
[45] Date of Patent: Dec. 17, 1985

[54] APPARATUS FOR TRANSFERRING PULVERULENT MATERIAL

[76] Inventor: Sune J. R. Carlsson, Talläsvägen 8, 311 01 Falkenberg, Sweden

[21] Appl. No.: 651,640

[22] PCT Filed: May 17, 1982

[86] PCT No.: PCT/SE82/00176
§ 371 Date: Jan. 17, 1983
§ 102(e) Date: Jan. 17, 1983

[87] PCT Pub. No.: WO82/04034
PCT Pub. Date: Nov. 25, 1982

Related U.S. Application Data

[63] Continuation of Ser. No. 459,545, Jan. 17, 1983, abandoned.

[30] Foreign Application Priority Data

May 21, 1981 [SE] Sweden .................................. 8103221

[51] Int. Cl.$^4$ .............................................. B65B 1/04
[52] U.S. Cl. .................... 141/286; 141/392; 141/256
[58] Field of Search .................... 141/37–68, 141/250–284, 285–310, 392, 114, 10, 1–9, 12, 313–317

[56] References Cited

U.S. PATENT DOCUMENTS 4,162,148  7/1979  Fürstenberg ........................ 141/286
4,185,669  1/1980  Jevakohoff .......................... 141/286

FOREIGN PATENT DOCUMENTS 2754394  6/1978  Fed. Rep. of Germany .

Primary Examiner—Houston S. Bell, Jr.
Attorney, Agent, or Firm—Beveridge, DeGrandi & Weilacher

[57] ABSTRACT

An apparatus for transferring a pulverulent material from a storage area to a destination site comprises a screw conveyor for transporting the material. The screw conveyor has an inlet and an outlet for the material. A filter surrounds the conveyor at least at the outlet of the conveyor and allows the passage essentially only of air therethrough. A damper at the outlet of the conveyor controls the flow of material from the outlet, and a damper is operative to be opened by the material transported by the screw conveyor. The filter comprises a filter sheet in the form of a circular drum having an inner side and a multiplicity of frusto-conical rings. The rings are disposed on the inner side of the drum and directed with their ends of smaller diameter in a direction towards the damper. The apparatus is useful for filling packages with finely pulverized materials, such as kaolin clay, lime and starch.

12 Claims, 2 Drawing Figures

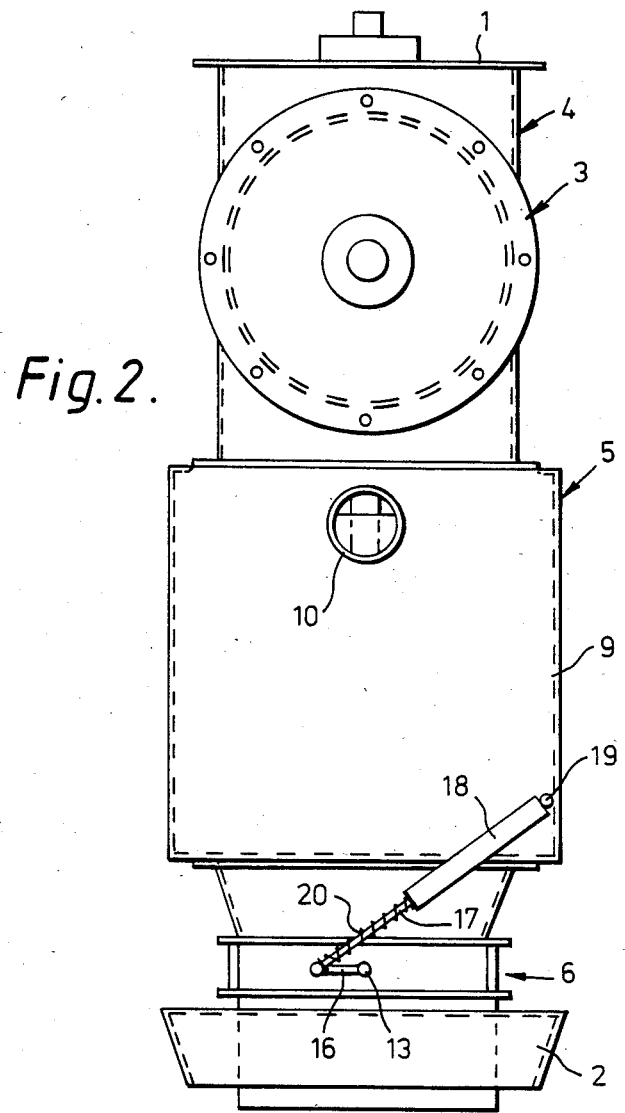

APPARATUS FOR TRANSFERRING PULVERULENT MATERIAL

TECHNICAL FIELD

This application is a continuation of application Ser. No. 459,545, filed Jan. 17, 1983, now abandoned.

The present invention relates to a method of transferring a pulverulent material, for example such materials having a propensity to float in the air such as kaolin clay, lime, starch etc., from a store to a site of use or a container, for example a package in the form of a bag, sack, large sack or the like, and a apparatus for carrying out the method.

THE STATE OF THE ART

The handling of pulverulent materials is beset by great problems inherent in the propensity of the particles of the powder to float in the air, a propensity which is greater the smaller the particles are. The problems are particularly manifest with such materials as kaolin clay, lime, starch and so on. These problems inherent in the propensity of the particles to float in the air occur particularly on the transfer of the material from a store to a site of use, a container or a package, for example from a silo to a normal sack or a large sack. In such cases, the problems result in considerable filling times and the filling efficiency will be relatively slight even though filling of the sacks is effected progressively in as much as a certain amount of material is introduced into the sack, whereupon the sack is placed to one side until the floating particles have come to rest, whereafter a further amount of material is introduced into the sack, and so on. However, it has proved that this further amount of material contains a large portion of floating particles and, moreover, a large amount of the particles already at rest in the sack will be caused once again to float in the air. For filling the sack to an acceptable degree, filling must be effected with extreme caution and with very small amounts of material at a time. Such a filling operation becomes extremely time-consuming and, as a result, occasions very high operational costs.

TECHNICAL PROBLEM

The task forming the basis of the present invention is to facilitate the transfer of pulverulent material from a store to, for example, a sack, while as good as completely obviating the problems inherent in the propensity of the particles of the material to float in the air.

The above-mentioned task is solved according to the present invention in that the method disclosed by way of introduction is characterised in that the material is fed to a nozzle by means of a screw conveyor, that air, in which the material floats during the conveyance through the screw conveyor, is removed by suction by the intermediary of a filter surrounding the screw conveyor, and that the material is urged past a damper arrangement by means of the screw conveyor. The air in the container which is to receive the material is removed by suction while the material is urged past the damper arrangement. The speed of the screw conveyor, the removal of air ahead of the damper arrangement, the opening resistance of the damper arrangement and possibly the removal by suction of air from the package are all regulated in dependence upon the desired reduction of particle floatation. The speed of the screw conveyor, the removal by suction of air ahead of the damper arrangement, the opening resistance of the damper arrangement, and possibly the removal by suction of air from the package are each regulated individually or in relation to one another. The package (the sack) is fixedly clamped on the nozzle and is progressively fed downwardly from the nozzle according as it is filled. An apparatus for carrying out the method according to the present invention is characterised in that at least one end portion of a screw conveyor is surrounded by a filter for allowing the passage essentially only of air, that a damper arrangement is disposed at the end of the screw conveyor and the filter, and that the damper arrangement is operative to be opened by the material fed through the filter by means of the screw conveyor. The filter consists of a suitable filter screen forming a circulate drum and frusto-conical rings disposed on the inside of the drum and directed with the end of smaller diameter in a direction towards the damper arrangement. The rings are located in one another for mutual overlapping, the smaller diameter being as large as or greater than the diameter of the screw disposed in the screw conveyor. The damper arrangement consists of two semi-circular damper blades which are each pivotal about their shaft, at least the one shaft being coupled to a closure device with opening resistance.

ADVANTAGES

The method and apparatus according to the present invention make possible filling of containers, normal sacks, large sacks and also other packages with extremely fine pulverulent materials, for example kaolin clay, lime, starch and so on which display an extremely great propensity to float. Filling by means of the method and apparatus according to the present invention can, furthermore, be effected continuously at substantially the same speed as in filling operations with other materials of a heavier nature without a propensity to float. Moreover, the filling operation or material transfer operation using the apparatus according to the present invention can be effected as good as totally dust-free.

DESCRIPTION OF THE ACCOMPANYING DRAWINGS

FIG. 2 is a side elevation of the embodiment of the present invention illustrated in FIG. 1.

Figure 1:
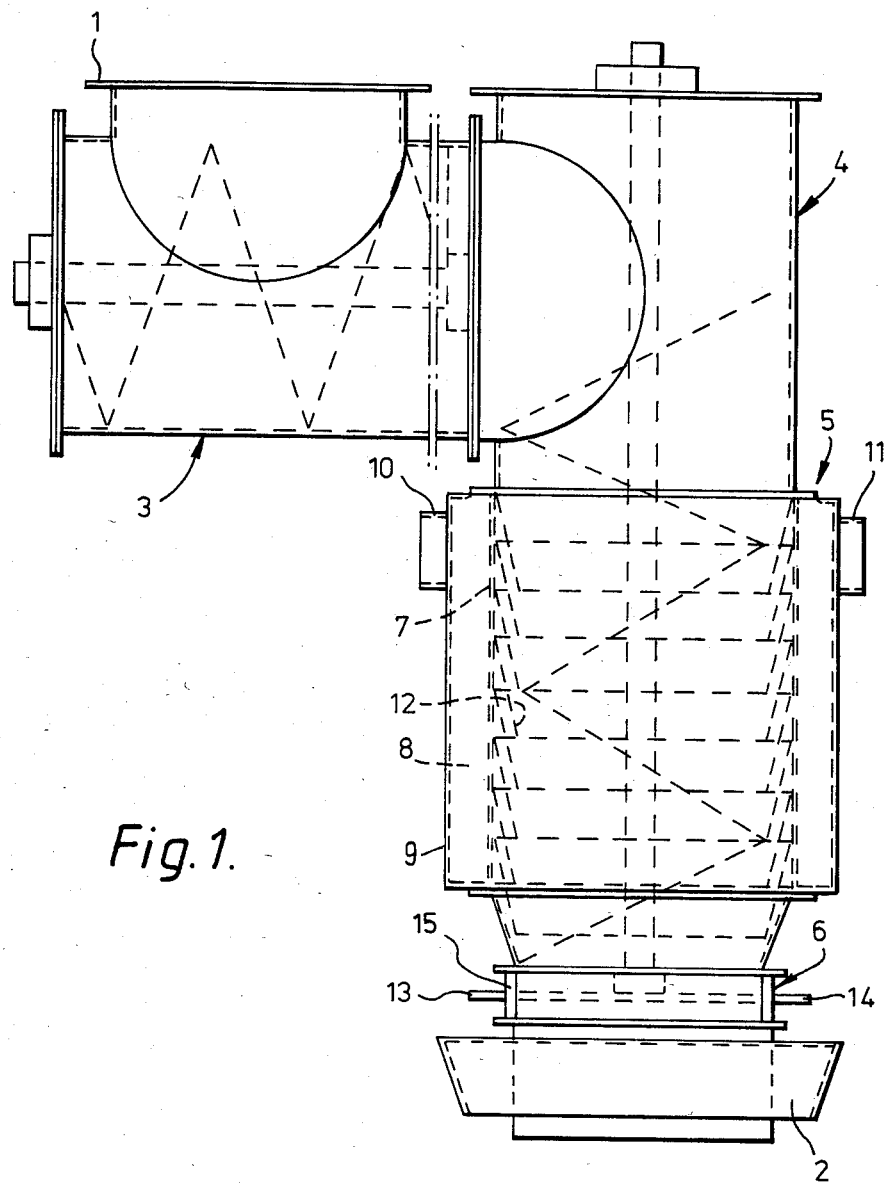
FIG. 1 is a schematic front elevation of an apparatus according to one embodiment of the present invention.

The embodiment of the present invention illustrated on the drawings is intended to be connected, by the intermediary of a connection socket 1, to the outlet of a silo (not shown). The illustrated apparatus is operative to fill, by the intermediary of a nozzle 2, for example large sacks with material from the silo. The nozzle 2 has merely been intimated on the drawing, but may be of the type described in greater detail in Swedish patent application No. 7810684-6. By means of such a nozzle 2, the inner portion of a large sack is clamped between an inner section and an outer section, the inner portion of the large sack being released gradually as it is filled with material.

Material from the silo is fed from the socket 1 by means of a screw conveyor 3 which may be of conventional construction and which extends horizontally up to a vertical screw conveyor 4 which is also of the conventional type. A filter 5 is disposed about the lower end of the screw conveyor 4 and the lower end of the screw conveyor 4 is closed by means of a damper arrangement 6.

The filter 5 includes a filter sheet 7 of conventional, essentially air-permeable type. The filter sheet 7 is, naturally, mounted in the conveyor 4 in such a way that no great amounts of material particles can pass through the filter out into the distribution chamber 8 in the filter located around the filter sheet 7 and formed by a cylindrical jacket 9. It should here be observed that the filter sheet 7 extends, naturally, cylindrically about the screw conveyor 4. The jacket 9 is sealingly mounted on the conveyor 4, like the filter sheet 7. Furthermore, the jacket 9 has a connection socket 10 and a connection socket 11. The sockets 10 and 11 are connected to a suitable fan for realizing partial vacuum in the distribution chamber 8. A number of rings 12 is disposed on the inside of the filter sheet 7. In the illustrated embodiment, the rings 12 are eight in number, although this number may be selected from case to case depending upon different operational requirements. Each ring 12 is in the form of a truncated cone and the end having the greater diameter is anchored, by means of through bolts, in hoops which extend about the outside of the filter sheet 7. The rings 12 are directed with the end having the smaller smaller towards the damper arrangement 6. The smaller diameter of the rings 12 is as great as or slightly greater than the diameter of the screw in the screw conveyor 4 in the region of the rings. It is further apparent to the skilled reader of FIG. 1 that the rings 12 are passed in one another for mutual overlapping. In the illustrated embodiment, the rings 12 are seen to be passed in one another to almost 50% of the height of the rings. As was mentioned above, in the illustrated embodiment the rings 12 are anchored in hoops. It should, however, be pointed out that the hoops may be disposed either on the outer side or on the inner side of the filter sheet 7 and in a tested prototype, the hoops were three in number.

The damper arrangement 6 is located beneath the screw conveyor 4 whose outer wall tapers towards the damper arrangement 6. This consists of two semi-circular damper blades which are each pivotal about their respective shaft 13 and 14. The shafts 13 and 14 are journalled in the circular wall 15 of the damper arrangement 6 which extends about the damper blades. One end of the shafts 13 and 14 extends out through the wall 15 and supports a crank 16. The free end of the crank 16 is coupled to the end of a piston rod 17 whose other end mounts a piston in a piston and cylinder assembly 18 which is pivotally mounted on the jacket 9 at 19 (FIG. 2). FIG. 2 shows these components in a position with the damper blades in the closed state. It should be observed that the shaft end 14 is provided with a similar arrangement with a crank 16, piston rod 17, piston and cylinder assembly 18 and is mounted at 19 on the jacket 9. Furthermore, there is disposed on the piston rod 17 a spring 20 which is of the compression type and serves to counteract pivoting of the damper blades in a direction towards opening. The damper arrangement 6 functions in such a manner that the damper blades are opened on actuation thereof by means of the material at a certain force which is realised by the spring 20. When this force has been overcome, the crank 16 pivots clockwise under compression of the spring 20 and insertion of the piston on the piston rod 17 in the piston and cylinder assembly 18. The spring 20 and the piston on the piston rod 17 constantly strive to pivot the damper blades in a direction for closure. The damper arrangement 6 may, thus, be considered as a closure device with a certain opening resistance.

Furthermore, the filter 5 may include one or more impact devices which strike the filter sheet 7 and the rings 12 anchored in the hoops, whereby possible material clogging and collection is loosened from these components. Such material collection may also be obviated by aspiration of the filter 5 in such a manner that air is fed in through the connection sockets 10 and 11. This air infeed is, naturally, but of brief duration and may very well be effected intermittently. Dampers may be disposed in the conduits from the connection sockets 10 and 11 for regulating the air flow.

As has been previously pointed out, the nozzle 2 is, in cases when the apparatus according to the present invention is to be applied for filling large sacks, designed according to Swedish patent application No. 7810684-6, whereby it is possible to remove air by suction from the interior of the large sack while the sack is filled with material. It is similarly apparent that, in such a case, the interior of the large sack is clamped between the inner section of the nozzle and its outer section and is successively released downwardly as material is being filled into the sack. After application of a large sack interior or the like onto the nozzle 2, air is evacuated therefrom, whereafter material from the silo is caused to flow down into the screw conveyor 3 which feeds material up to the screw conveyor 4. The screw conveyor 4 feeds the material downwardly through the filter 5 and, during this feeding of the material down through the filter 5, air is sucked out of the filter by the intermediary of the connection sockets 10 and 11. When the material reaches the damper arrangement 6 or, more precisely, the damper blades, the material movement is stopped because of the resistance of the damper blades to being pivoted in an opening direction. Obviously, the material will then be compacted above the damper blades and, on attainment of a certain degree of compaction, the material will exercise a sufficient force on the damper blades to open them. As soon as the material has opened the damper blades against the action of the spring or springs 20, the material will be urged further down past the nozzle 2 and into the interior of the large sack which is released downwardly by degrees as it is filled with material. As was mentioned above, it has also proved to be effective also to suck air out of the interior of the large sack on, as it were, the outside of the damper arrangement 6.

Naturally, the nozzle 2 need not be a nozzle of the type disclosed in Swedish patent application No. 7810684-6 but can, of course, be totally adapted to the package, container or the like which is to receive the material from the silo.

The force in the springs 20, the speed of the screw 4 and the partial vacuum in the chamber 8 are varied in a suitable manner in relation to the material which is to be transferred from the silo to the container or sack at the nozzle 2.

After filling of, for example, the interior of a large sack to the desired degree or to the desired weight, it is suitable to seal the interior of the large sack before it is released completely from the nozzle 2. In this way, it is possible to carry out an almost completely dust-free filling of the interior of the large sack.

I claim:

1. An apparatus for transferring a pulverulent material from a store to a destination site, said apparatus comprising a screw conveyor means for transporting said pulverulent material, said screw conveyor having an inlet and an outlet for said material;

a filter means for allowing the passage essentially only of air therethrough, said filter surrounding said conveyor at least at the outlet of said conveyor;

damper means disposed at the outlet of said conveyor means for controlling flow of material from said outlet, wherein said damper means is operative to be opened by the material transported by the screw conveyor;

wherein said filter means comprises a filter sheet in the form of a circular drum having an inner side and a multiplicity of frusto-conical rings, said rings disposed on the inner side of said drum and directed with their ends of smaller diameter in a direction towards said damper means.

2. Apparatus as claimed in claim 1, wherein said rings are located one within another in overlapping arrangement.

3. Apparatus as claimed in claim 1, wherein said screw in said conveyor defines an imaginary cylindrical surface when said screw rotates, and wherein the smaller diameter of each of said frusto-conical rings is at least as great as the diameter of said cylindrical surface.

4. Apparatus as claimed in claim 1, wherein said damper means comprises two semi-circular damper blades each of which is pivotal about a shaft, wherein at least one of said shafts is coupled to a closure means for providing opening resistance to said blade.

5. Apparatus according to claim 1 in which said material has a propensity to float in air.

6. Apparatus according to claim 2 in which said material is at least one material selected from the group consisting of kaolin clay, lime and starch.

7. Apparatus according to claim 1 in which said destination site is a container.

8. Apparatus according to claim 7 in which said container is a bag.

9. An apparatus for transferring a pulverulent material, which has a propensity to float in air, from a store to a destination site, said apparatus comprising a screw conveyor means for transporting said pulverulent material, said screw conveyor having an inlet and an outlet for said material;

a filter means for allowing the passage essentially only of air therethrough, said filter surrounding said conveyor at least at the outlet of said conveyor;

damper means disposed at the outlet of said conveyor means for controlling flow of material from said outlet, wherein said damper means is operative to be opened by the material transported by the screw conveyor;

wherein said filter means comprises a filter sheet in the form of a circular drum having an inner side and a multiplicity of frusto-conical rings, said rings disposed on the inner side of said drum and directed with their ends of smaller diameter in a direction towards said damper means; and wherein said screw in said conveyor defines an imaginary cylindrical surface when said screw rotates, and wherein the smaller diameter of each of said frusto-conical rings is at least as great as the diameter of said cylindrical surface.

10. Apparatus as claimed in claim 9, wherein said damper means comprises two semi-circular damper blades each of which is pivotal about a shaft, wherein at least one of said shafts is coupled to a closure means for providing opening resistance to said blade.

11. An apparatus for transferring a pulverulent material, which has a propensity to float in air, from a store to a container, said apparatus comprising a screw conveyor means for transporting said pulverulent material, said screw conveyor having an inlet and an outlet for said material;

a filter means for allowing the passage essentially only of air therethrough, said filter surrounding said conveyor at least at the outlet of said conveyor;

damper means disposed at the outlet of said conveyor means for controlling flow of material from said outlet, wherein said damper means is operative to be opened by the material transported by the screw conveyor;

wherein said filter means comprises a filter sheet in the form of a circular drum having an inner side and a multiplicity of frusto-conical rings, said rings disposed on the inner side of said drum and directed with their ends of smaller diameter in a direction towards said damper means;

wherein said rings are located one within another in overlapping arrangement; and wherein said screw in said conveyor defines an imaginary cylindrical surface when said screw rotates, and wherein the smaller diameter of each of said frusto-conical rings is at least as great as the diameter of said cylindrical surface.

12. Apparatus as claimed in claim 11, wherein said damper means comprises two semi-circular damper blades each of which is pivotal about a shaft, wherein at least one of said shafts is coupled to a closure means for providing opening resistance to said blade.

* * * * *